3,592,740
PRODUCTION OF CELL CULTURE CONCENTRATES
Verle Wayne Christensen, Madison, Wis., assignor to Niles Laboratories, Inc., Elkhart, Ind.
No Drawing. Filed Mar. 28, 1968, Ser. No. 717,010
Int. Cl. C12b 1/00
U.S. Cl. 195—96
8 Claims

ABSTRACT OF THE DISCLOSURE

Novel cell culture concentrates having improved activity can be prepared by a process of inoculating a liquid buffered milk-containing culture medium with an appropriate lactic acid-producing bacterial culture, incubating said inoculated medium to grow bacterial culture cells therein until a desired pH level is attained, adding alkaline material to raise the medium pH to a desired level, cooling the medium and separating the bacterial culture cells from the liquid portion of the culture medium to form a cell culture concentrate.

BACKGROUND AND PRIOR ART

In the production of cheese, milk is treated with a bacterial culture and with a milk clotting agent, such as rennin, to form a solidified curd which is then separated from the liquid whey. The curd is then further processed and cured to form finished cheese. The bacterial culture, or "starter culture," is employed to liberate lactic acid to provide the desired acid conditions for cheesemaking. The starter culture also provides the desired flavor, body, texture and odor characteristics of the resulting cheese.

In a typical cheesemaking plant a freeze-dried bacterial culture is used to inoculate a relatively small volume (about ⅔ quart) of sterilized non-fat milk containing about 10–12 percent (weight/volume basis) total solids. This mixture is then incubated to form a desired amount of bacterial growth. The resulting culture is then used in a 1 volume percent amount to inoculate about a three gallon quantity of partially sterilized non-fat milk. This mixture is then incubated to form a "mother culture." The mother culture is then used in its entirety to inoculate about 300 gallons of partially sterilized non-fat milk. This mixture is then incubated to form a "bulk starter culture" which is then used in amounts of 1 volume percent to inoculate production batches of pasteurized or heat treated milk. These production batches of inoculated milk totaling about 30,000 gallons are then used in cheese production.

This prior art process has several disadvantages for the cheese manufacturer. First, it requires many separate growth steps to produce the bulk starter culture which is then employed to inoculate the production batches of milk. Such multiple growth steps require time, labor and extra equipment. Second, each time an inoculation and attendant growth step takes place, there is an opportunity for contamination by undesirable microorganisms and bacteriophage to take place.

In an effort to overcome the disadvantages described above the prior art has suggested that a bacterial culture concentrate be prepared which could be used directly in a convenient small volume to inoculate milk to form the bulk starter culture. This concentrate was generally prepared by growing the desired bacterial culture in a non-milk medium until a desired number of bacterial cells were produced. The cells were then separated from the liquid portion of the medium. The concentrate could then be used directly to inoculate the bulk starter culture or it was preferably frozen and maintained in a frozen condition until subsequently needed. The cell concentrate could thus be prepared at one location and shipped in a frozen condition to many cheesemaking plants at other locations for subsequent use. These prior starter culture concentrates were generally not acceptable. They had non-reproducible activity and they frequently required undesirably longer processing times to achieve desired milk coagulation in cheese production.

OBJECTS AND DESCRIPTION OF THE INVENTION

It is an object of the present invention to provide an improved process for the production of cell culture concentrates which can be directly used to inoculate large quantities of milk for the production of cheese or other cultured milk products.

It is a further object to provide an improved cell culture concentrate having improved lactic acid-producing activity.

In accordance with the present invention a process is provided which comprises inoculating a liquid buffered milk-containing culture medium with a lactic acid-producing bacterial culture, incubating said inoculated medium to grow bacterial culture cells therein until a desired pH level is attained, adding alkaline material to raise the medium pH to a desired level, cooling the medium and separating the bacterial culture cells from the liquid portion of the culture medium to form a cell culture concentrate.

The lactic acid-producing bacterial cultures useful in this invention are any of the cultures known to be useful in the production of cheese and other cultured milk products. Illustrative examples are *Streptococcus lactis, Streptococcus cremoris, Streptococcus diacetilactis* and the like.

The buffered milk-containing culture medium is an essential part of the present invention. When the culture cells are in a milk-containing medium for the production of the culture cell concentrate, there is no shock to their lactic acid-producing metabolic activity when the concentrate is subsequently added to a milk medium for the production of a bulk starter culture, for example. This enables the cell culture concentrate to maintain its full lactic acid-producing activity under use conditions.

The culture medium should contain from about 3 to about 8 percent (weight/volume basis) non-fat milk solids. Preferably the culture medium should contain about 5 percent non-fat milk solids. At levels of non-fat milk solids below about 3 percent, there is insufficient cell growth and therefore lowered acid producing activity when the culture is subsequently added to a milk medium. There is no particular advantage in using more than about 8 percent non-fat milk solids in the culture growth medium. If desired, a portion of the non-fat milk solids can be substituted by minor amounts of demineralized whey powder, or lactose. In any event the total amount of non-fat milk solids and any substituents should be in the range of about 3 to about 8 percent.

The culture medium is buffered to an initial pH of from about 6.4 to about 7 by the inclusion of phosphate salts in an amount from about 1.25 to about 2 percent (weight/volume basis). At least 50 weight percent of the phosphate salts should be ammonium phosphates. The phosphate salts, such as diammonium phosphate, monoammonium phosphate, disodium phosphate and the like, not only provide the desired pH conditions which are beneficial to cell growth, but they also sequester the calcium and other divalent cations present in the culture medium. Bacteriophage, which can seriously interfere with normal cell activity, requires calcium and other divalent cations for its growth. The presence of the phosphate salts in the culture medium thus greatly inhibits bacteriophage activity.

The buffered milk-containing culture medium also contains from about 0.1 to about 0.4 percent (weight/volume basis) of an acetate salt, such as sodium acetate, potassium acetate, ammonium acetate and the like. It further contains from about 0.5 to about 1.5 percent (weight/ volume basis) of a polyhydroxy alcohol, such as glycerol, polyethylene glycol, ethylene glycol, propylene glycol and the like. The acetate salt, preferably sodium acetate, and the polyhydroxy alcohol, preferably glycerol, present in the medium enable the lactic acid-producing bacteria to form thicker cell walls. These bacteria are thus healthier and more resistant to harmful bacteriophage attack than bacteria grown in the absence of such additives. It has been shown that when cell culture concentrates are prepared from buffered milk-containing culture media with and without the acetate salt and the polyhydroxy alcohol and the concentrates are subsequently used in cheesemaking runs, the inoculated milk media produced from the concentrates containing the above additives contained a significantly lower level of bacteriophage than the inoculated milk media produced from the concentrates which did not contain the above additives.

The buffered milk-containing culture medium also contains about 0.25 to about 0.3 percent (weight/volume basis) of a culture stimulant, such as yeast hydrolyzate, dry pancreas extract and the like, which aids in the metabolism of the culture cells by supplying readily assimilable nitrogen. It further contains from about 1.9 to about 6.9 percent (weight/volume basis) dextrose. The dextrose is employed to provide an overall solids level in the medium from about 8 to about 12 percent (weight/volume basis) and preferably from about 10 to about 12 percent. Since the solids level (weight/volume basis) of the milk medium used for cheesemaking is from about 8 to about 12 percent, the activity of the culture cells can be maintained at a high level if they are grown in a solids level which is comparable to that in which they will eventually be used. There is thus no osmotic shock to the cells when the cell culture concentrate is added to the production milk medium. In addition to providing a desirable solids level, the dextrose provides a source of carbohydrate nutrient for the cell fermentation gowth.

In the performance of the process of the present invention the buffered milk-containing culture medium described above is inoculated with the desired lactic acid-producing bacterial culture and the inoculated medium is incubated at a temperature from about 68° F. (20° C.) to about 75° F. (24° C.), preferably from about 70° F. (21° C.) to about 72° F. (22° C.), until a medium pH of less than about 5 is attained. This usually requires about 15–16 hours. This incubation temperature range enables cell concentrates to be obtained which have more stable actic acid-producing activity than cell concentrates which were prepared using higher incubation temperatures.

The incubation is stopped when the medium pH reaches a level less than about 5, preferably from about 4.7 to about 5. It has been found that incubation termination at this point enables cell concentrates of high activity to be produced. In the prior art, incubation was continued until a maximum cell count (number of bacterial cells/ml.) was obtained or until all the fermentable sugars were consumed. Cell concentrates produced under these prior art conditions had erratic lactic acid-producing activities and also had lower activities, even at higher cell counts, than the concentrates produced by the present invention.

It has also been found that when the incubation is terminated at a pH of about 4.7 to about 5, the resulting cell characteristics are the same as those of the original inoculating culture. When incubation is continued until all fermentable sugar is consumed or until maximum cell count is achieved, the resulting cell characteristics are generally different from those of the original culture. This is generally undesirable.

The use of a milk-containing medium for the production of cell culture concentrates is unobvious and a definite improvement when compared to the prior art. In the prior art, a non-milk medium was used to grow the culture cells. When the resulting cells were then used to inoculate a milk medium, as in the production of cheese, the cells had to acclimate themselves to the new growth medium. This often caused an undesirable increase in processing time and also caused erratic activity of the culture. The prior art intentionally avoided a milk-containing medium for the production of cell concentrates. The lactic acid produced by the cell growth will cause coagulation of the milk protein. These solids will then dilute the cell concentrate when the cells and solids are separated from the liquid portion of the cell growth medium.

This potential disadvantage of using a milk-containing medium for production of cell concentrates is overcome in the present invention by solubilizing the coagulated milk proteins through the addition of an alkaline material to achieve a culture medium pH of greater than about 6, preferably about 6–6.8. While any alkaline material, such as ammonium hydroxide, sodium hydroxide, sodium carbonate and the like, might be used to increase the pH, it has been found that potassium hydroxide is preferred in that it is not as toxic to the bacterial cells as are other alkaline materials.

In a preferred form of the present invention, the inoculated medium is incubated until a pH of less than about 5 is attained, alkaline material, preferably potassium hydroxide, is added to raise the pH to a value greater than about 6, the medium is further incubated until a pH of less than about 5 is attained, which requires about 1–2 hours of incubation at 68–75° F., and alkaline material preferably potassium hydroxide, is again added to raise the culture medium pH to a value greater than about 6. The above procedure tends to result in cell concentrates having maximum activity.

At the termination of incubation, the culture medium is then cooled to a temperature from about 40° F. (4° C.) to about 45° F. (7° C.) as rapidly as possible. Generally this cooling procedure should be accomplished in 30 minutes or less. If this cooling takes place over a period as long as one hour, the culture can lose about 10–20 percent of its lactic acid-producing activity.

The cooled culture medium is then treated with conventional means, such as a centrifuge to separate the bacterial culture cells from the liquid portion of the culture medium. The resulting cell culture concentrate can be directly used to inoculate a milk medium for the production of cheese or other cultured milk products. Preferably the concentrate is further cooled to a temperature of at least below −100° F. (−73° C.), preferably at least −300° F. (−184° C.), and stored at this low temperature until subsequently needed. It can then be warmed to desired temperature, about 50–75° F. (10–21° F.), and used for inoculation purposes.

The commercial acceptability of a specific cell culture concentrate for use in cheesemaking, for example, can be conveniently determined in the following manner. A cell culture concentrate is employed in an amount of 0.1 volume percent to inoculate a 100 cc. portion of a sterilized non-fat milk medium containing about 12 percent (weight volume basis) total solids. The inoculated medium is then incubated at 88–90° F. The cell concentrate should have sufficient lactic acid-producing activity such that the 0.1 volume percent concentration will start to coagulate the milk in about 4½ hours. It is also desirable that an inoculated 12 percent solids milk medium containing 0.1 volume percent cell concentrate should develop an acidity increase of at least 0.75 percent (weight/volume basis) after 6 hours of incubation at 88–90° F.

The invention will be further described in the following examples.

Example 1

A buffered milk-containing culture medium was prepared by mixing the following ingredients and adding sufficient water to make a total mixture volume of 100 gallons:

| | Lbs. |
|---|---|
| Non-fat milk solids | 37.50 |
| Yeast hydrolyzate | 2.25 |
| Diammonium phosphate | 9.00 |
| Monoammonium phosphate | 4.50 |
| Disodium phosphate | 2.50 |
| Dextrose | 30.00 |
| Sodium acetate | 2.75 |
| Glycerol | 8.75 |
| | 97.25 |

The resulting mixture contained 11.67 percent (weight/volume basis) dissolved solids and had the following composition:

| Component: | Percent (weight/volume basis) |
|---|---|
| Non-fat milk solids | 4.5 |
| Yeast hydrolyzate | 0.27 |
| Diammonium phosphate / Monoammonium phosphate / Disodium phosphate | 1.92 |
| Dextrose | 3.6 |
| Sodium acetate | 0.33 |
| Glycerol | 1.05 |

In this mixture the ammonium phosphates constituted 84.4 weight percent of all the phosphate salts.

The above culture medium which had a pH of about 6.8 was then sterilized at 270–275° F. (132–135° C.) for 30 seconds and introduced to a sterilized fermenter where the medium was cooled to 70° F. The medium was then inoculated with a 1 volume percent quantity of seed culture composed of a belnd of various commercially available strains of *Streptococcus cremoris*. The inoculated culture medium was then maintained under sterile air pressure of 5 p.s.i.g. and temperature of 70° F. with periodic agitation for 16 hours. The pH of the culture medium was 4.8. The medium was then cooled within 30 minutes to 45° F. As the medium was cooling, the pH of the medium was adjusted to 6.8 by addition of potassium hydroxide solution. A total of about 8.5 lb. of potassium hydroxide was required to achieve the desired final pH. The resulting culture medium was then transferred under sterile conditions to a sterilized centrifuge where the bacterial culture cells were separated from the liquid portion of the medium. The concentrated culture was then tested for its activity. A 0.1 volume percent amount of concentrate added to a sterilized milk medium produced initial coagulation in 4 hours and 50 minutes at 88–90° F., which is an acceptable value. It also developed an acidity increase of at least 0.75 percent (weight/volume basis) after 6 hours of incubation at 88–90° F. in a further activity test. The cell concentrate was then canned and sealed in sterile cans and frozen by immersion in liquid nitrogen at a temperature below −300° F. The frozen cans were then stored at liquid nitrogen temperature.

Example 2

A can containing 75 ml. of a frozen cell concentrate prepared in Example 1 above was removed from liquid nitrogen storage and was thawed to room temperature by placing it in tap water at 50–70° F. to which about 15–20 parts per million chlorine had been added. After 5–10 minutes the can contents were sufficiently loosened from the sides of the can so that they could be added to about 300 gallons of partially sterilized non-fat milk bulk starter medium. The medium was agitated to evenly distribute the cell concentrate. The medium was then incubated at 70° F. for 13 to 15 hours and was then used to inoculate several production batches of pasteurized milk. Rennin was then added and the cheesemaking process was continued to produce an acceptable grade of cheddar cheese.

Example 3

A buffered milk-containing culture medium described in Example 1 was sterilized, placed in a sterile fermenter, inoculated with the same seed culture of Example 1, and incubated at 70° F. with periodic agitation for 15 hours. The pH was 4.8–5.0. A solution of potassium hydroxide was added with agitation to increase the pH to a value of 6.8. The incubation was continued for an additional 1–1½ hours to achieve a pH level of 4.8–5.0. Additional potassium hydroxide was added to increase the pH to 6.8. The medium was then cooled and centrifuged. The resulting cell concentrate had coagulation activity at 0.1 volume percent concentration of 4 hours and 30 minutes at 88–90° F. The concentrate was then sealed in sterile cans and frozen in liquid nitrogen. These cans were then subsequently thawed to room temperature and were successfully used in the manner described in Example 2 to make bulk starter cultures which produced acceptable cheddar cheese.

While the above examples employed a specific bacterial culture blend, it should be understood that other blends and single strains of other organisms can be used to produce cell concentrates suitable for the production of cheddar and other types of cheese, as well as cultured milk products, such as buttermilk and sour cream. In the case of cultured milk products, the cell concentrate can frequently be added directly to the production size milk medium without going through a bulk starter culture step.

In summary, the present invention resides in a novel process for preparing novel high activity bacterial cell culture concentrates from a milk medium which can conveniently be used to directly inoculate bulk starter cultures or production size batches of milk for the production of cheese and other cultured milk products.

What is claimed is:

1. A process for the production of a cell culture concentrate which comprises inoculating with a lactic acid-producing bacterial culture a liquid milk-containing culture medium which is buffered to an initial pH of from about 6.4 to about 7 by the inclusion of phosphate salts wherein at least 50 weight percent of the phosphate salts are ammonium phosphate, said culture medium also containing from 0.25 to 0.3 percent (weight/volume basis) yeast hydrolyzate, from 1.9 to 6.9 percent (weight/volume basis) dextrose, from 0.1 to 0.4 percent (weight/volume basis) acetate salt, and from 0.5 to 1.5 percent (weight/volume basis) polyhydroxy alcohol, incubating said inoculated medium to grow bacterial culture cells therein until a pH of 4.7 to 5 is attained, adding alkaline material to raise the medium pH to a value of about 6 to about 6.8, cooling the medium and separating the bacterial culture cells from the liquid portion of the culture medium to form a cell culture concentrate.

2. A process according to claim 1 wherein the cell culture concentrate is further cooled to a temperature of at least below −100° F. and stored at this low temperature.

3. A process according to claim 1 wherein the cell culture concentrate is further cooled to a temperature of at least −300° F. and stored at this low temperature.

4. A process according to claim 1 wherein the inoculated medium is incubated at a temperature of from about 68° to about 75° F.

5. A process according to claim 1 wherein the medium is rapidly cooled to a temperature of from about 40° F. to about 45° F. before the bacterial culture cells are separated from the liquid portion of the culture medium.

6. A process according to claim 1 wherein prior to cooling the medium, the medium is further incubated until a pH of less than 5 is attained and alkaline material is added to again raise the medium pH to a value greater than about 6.

7. A process according to claim 1 wherein the added alkaline material is potassium hydroxide.

8. A process according to claim 1 wherein the inoculated medium is incubated at a temperature of from about 70° F. to about 72° F.

References Cited

UNITED STATES PATENTS

| | | | |
|---|---|---|---|
| 3,142,575 | 7/1964 | Tynan et al. | 195—96 |
| 3,395,081 | 7/1968 | Sherman et al. | 195—96 |
| 3,420,742 | 1/1969 | Farr | 99—59 |
| 3,041,248 | 6/1962 | Hargrove | 195—96 |

OTHER REFERENCES

Kosikowski: Cheese and Fermented Milk Foods. Distributed by Edwards Brothers Inc., Ann Arbor, Mich., p. 20, 1966.

ALVIN E. TANENHOLTZ, Primary Examiner

U.S. Cl. X.R.

99—59, 116; 195—48, 59

PO-1050
(5/69)

UNITED STATES PATENT OFFICE
CERTIFICATE OF CORRECTION

Patent No. 3,592,740      Dated July 13, 1971

Inventor(s) Verle Wayne Christensen

It is certified that error appears in the above-identified patent and that said Letters Patent are hereby corrected as shown below:

Column 1, Line 5, the assignee listed as "Niles Laboratories, Inc.", should be --Miles Laboratories, Inc.--.

Signed and sealed this 23rd day of November 1971.

(SEAL)
Attest:

EDWARD M. FLETCHER, JR.       ROBERT GOTTSCHALK
Attesting Officer      Acting Commissioner of Patents LED:jr